US010078498B2

(12) United States Patent
Chung et al.

(10) Patent No.: US 10,078,498 B2
(45) Date of Patent: Sep. 18, 2018

(54) METHOD, APPARATUS, SYSTEM, AND NON-TRANSITORY COMPUTER READABLE MEDIUM FOR EXTENDING AT LEAST ONE FUNCTION OF A PACKAGE FILE

(71) Applicant: LINE Corporation, Shibuya-ku, Tokyo (JP)

(72) Inventors: Sang Min Chung, Seongnam-si (KR); SangHun Jeon, Seongnam-si (KR); Tae Woo Kim, Seongnam-si (KR); Joo Hyeon Ryu, Seongnam-si (KR); Dongpil Seo, Seongnam-si (KR); Sungbeom Ahn, Seongnam-si (KR); Wang Jin Oh, Seongnam-si (KR); Seong Yeol Lim, Seongnam-si (KR); Myungju Chung, Seongnam-si (KR); Kwang-Hee Han, Seongnam-si (KR)

(73) Assignee: Line Corporation, Tokyo (JP)

( * ) Notice: Subject to any disclaimer, the term of this patent is extended or adjusted under 35 U.S.C. 154(b) by 19 days.

(21) Appl. No.: 15/434,202

(22) Filed: Feb. 16, 2017

(65) Prior Publication Data

US 2017/0242664 A1 Aug. 24, 2017

(30) Foreign Application Priority Data

Feb. 18, 2016 (KR) .......................... 10-2016-0019005

(51) Int. Cl.
*G06F 9/44* (2018.01)
*G06F 8/30* (2018.01)
(Continued)

(52) U.S. Cl.
CPC ................ *G06F 8/315* (2013.01); *G06F 8/70* (2013.01); *G06F 8/71* (2013.01)

(58) Field of Classification Search
CPC ............... G06F 8/315; G06F 8/70; G06F 8/71
(Continued)

(56) References Cited

U.S. PATENT DOCUMENTS 5,721,929 A * 2/1998 Pasquariello ............. G06F 8/71
717/168
6,957,228 B1 * 10/2005 Graser ................... G06F 9/4488
717/121

(Continued)

OTHER PUBLICATIONS

"Way to simply modifying a DEX file only for the Android Application (examples of WIFI MAC address change)," softdx, Naver blog, Korea, 2013, http://softdx.kr/60179921332.

(Continued)

*Primary Examiner* — Qing Chen
(74) *Attorney, Agent, or Firm* — Harness, Dickey & Pierce, P.L.C.

(57) ABSTRACT

Provided is a method, apparatus, system, and non-transitory computer readable medium for extending at least one function of a package file. A function addition method executed at a computer may include storing a package file for an application; extracting, from the package file, a file in which information about a class most initially called in response to execution of the application is set as configuration information of the application; and setting a class name of a new class to an item to which information about the most initially called class is set in the extracted file.

12 Claims, 10 Drawing Sheets

(51) Int. Cl.
*G06F 8/70* (2018.01)
*G06F 8/71* (2018.01)
(58) Field of Classification Search
USPC .................................................. 717/114–123
See application file for complete search history.

(56) References Cited

U.S. PATENT DOCUMENTS

| | | | | |
|---|---|---|---|---|
| 2012/0023481 | A1* | 1/2012 | Li | G06F 8/24 |
| | | | | 717/115 |
| 2012/0096043 | A1* | 4/2012 | Stevens, Jr. | G06F 17/30958 |
| | | | | 707/798 |
| 2013/0332898 | A1* | 12/2013 | Gall | G06F 9/4488 |
| | | | | 717/108 |
| 2016/0087953 | A1* | 3/2016 | Aamir | H04L 63/08 |
| | | | | 726/1 |

OTHER PUBLICATIONS

"Change of Android MAIN Activity," Urinwangza, Egloos blog, Korea, 2014, http://tiger5net.egloos.com/5838789.
Korean Office Action dated May 22, 2017 for corresponding Korean Patent Application No. 10-2016-0019005.
Korean Office Action dated Jul. 18, 2018 for corresponding Korean Application No. 10-2018-0049059.
"Android dynamic load classes", (https://github.com/wequick/Smal/wiki/Android-dynamic-load-classes).

\* cited by examiner

METHOD, APPARATUS, SYSTEM, AND
NON-TRANSITORY COMPUTER READABLE
MEDIUM FOR EXTENDING AT LEAST ONE
FUNCTION OF A PACKAGE FILE

CROSS-REFERENCE TO RELATED
APPLICATION(S)

This U.S. non-provisional application claims the benefit of priority under 35 U.S.C. § 119 to Korean Patent Application No. 10-2016-0019005 filed on Feb. 18, 2016, in the Korean Intellectual Property Office (KIPO), the entire contents of which are incorporated herein by reference.

BACKGROUND

Field

One or more example embodiments relate to a method, apparatus, system, and/or non-transitory computer readable medium for extending at least one function of a package file.

Description of Related Art

An Android application package (APK) is a package file that is used for distribution of software and middleware used in an Android operating system (OS), and has an extension '.apk'. To create the APK file, an Android program needs to be initially compiled and all of the files of the Android program need to be gathered into a single package file. The APK file includes all of the software code of the corresponding program and includes resources, information, certificate, a manifest file, and the like, for the program.

In the case of a package file for an application, such as the APK file, once a final package file is built, the code included in the package file may not be corrected, modified, and/or added. If code for a new function is to be added, a new package file must be created by adding the code for the new function to the original code and/or by adding a library that includes the code for the new function, and then re-compiling the program to include the code for the newly added function.

Also, if the code for the new function is added as a separate library, the code for loading and/or calling the added library needs to be further included in the original code. Since the library for the new function needs to be loaded and/or called by initially executing the original code, the new function may not be executed prior to the original code.

Likewise, to use a separate addition class, addition code for loading and thereby reading and using classes to a file that includes the addition class needs to be included in the original code prior to the building of the package file.

SUMMARY

One or more example embodiments provide a function extension method, apparatus, system, and/or non-transitory computer readable medium that may extend a function by inserting addition code executable prior to original code into a package file that is completed (e.g., already built, compiled, etc.) and does not allow for code correction.

One or more example embodiments also provide a function extension method, apparatus, system, and/or non-transitory computer readable medium that may immediately execute a new class without requiring a separate loading process, a definition process for a class interface, and/or an additional procedure for calling a call, when adding the new class to a package file.

According to an aspect of at least one example embodiment, there is provided a function addition method for a software package file, the method including storing, using at least one processor, a package file for an application in a memory, extracting, using the at least one processor, which information about an initialization class for execution of the apformation of the application from the package file, setting, using the at least one processor, a class name of a new class to an item of the configuration file to which the information about the initialization class is set in the extracted file, and execeast one processor, code for the application based on the initialization class and the configuration file.

According to an aspect of at least one example embodiment, there is provided a function addition method for a software package file, the method including storing, using at least one processor, a package file for software application in memory, creating, using the at least one processor, a configuration file that includes information about an existing class of the package file, the existing class information extracted from the package file by disassembling the package file, verifying, using the at least one processor, theisting class having an inheritance relationship with a class that constitutes an item for setting a super class within the created configuration file through the item, adding, using the at least one processor, new co to bytecodef the verified existing class, and recreating, using the at least one processor, the package file based on the bytecode to which the new code is added.

According to an aspect of at least one example embodiment, there is provided a function addition method for a software package file, the method including storing, using at least one processor, a package file for oftware application in memory, reading, using the at least one processor, a definition file in which a new class is defined from the memory, creating, using the at least one processor, an object associated with the deffile by, calling a method for creating pathElements or dexElements, and replacing the called method with the defined file as a factor, and adding, using the at least one processor, the created object to a dexElements array for referring to a class path of the package file.

According to some example embodiments, it is possible to extend a function by inserting an addition code executable prior to an original code into a package file that is completed and does not allow a code correction.

According to some example embodiments, it is possible to immediately execute a new class without a separate loading process, a definition process for a class interface, and/or an additional procedure for calling a call, when adding a new class to a package file.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
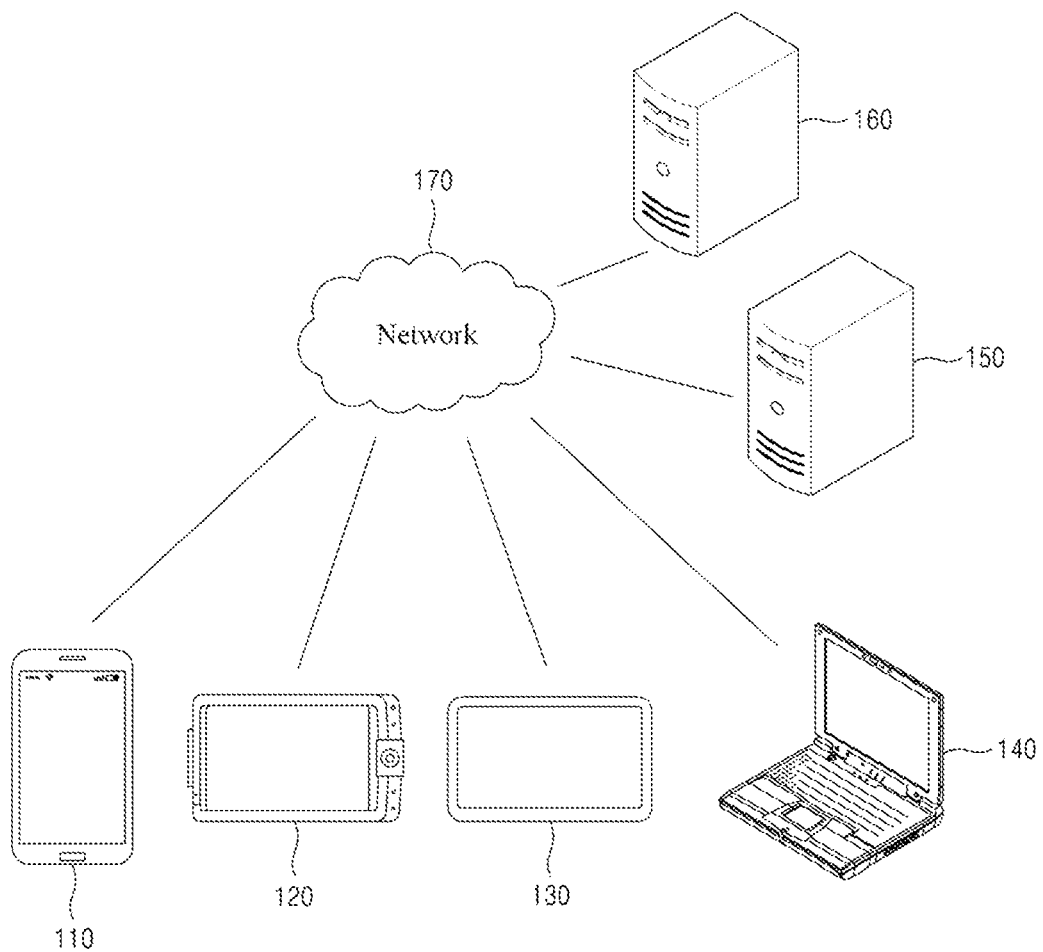
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example only and thus, the number of electronic devices and/or the number of servers are not limited thereto and may be a greater or lesser amount.

Each of the plurality of electronic devices 110, 120, 130, and 140 may be a fixed terminal or a mobile terminal configured as a computer device. For example, the plurality of electronic devices 110, 120, 130, and 140 may be a smartphone, a mobile phone, a personal navigation device, a computer, a laptop computer, a digital broadcasting terminal, a personal digital assistant (PDA), a portable multimedia player (PMP), tablet personal computer, an Internet of Things (IoT) device, a gaming console, a virtual personal assistant device, a smart device, a virtual reality device, an augmented reality device, and the like. For example, the electronic device 110 may communicate with other electronic devices 120, 130, and/or 140, and/or the servers 150 and/or 160 over the network 170 in a wired communication manner or in a wireless communication manner.

The communication scheme is not particularly limited and may include a communication method that uses a near field communication between devices as well as a communication method using a communication network, for example, a mobile communication network, the wired Internet, the wireless Internet, a broadcasting network, a satellite communication network, etc., which may be included in the network 170. For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, it is only an example and the example embodiments are not limited thereto.

Each of the servers 150 and 160 may be configured as a computer apparatus or a plurality of computer apparatuses that provides instructions, codes, files, contents, services, and the like, through communication with the plurality of electronic devices 110, 120, 130, and/or 140 over the network 170.

For example, the server 150 may extend at least one function, for example, provide an additional function, of an application, with respect to a package file of the application by registering the package file of the application uploaded from the electronic device 120 over the network 170. According to at least one example embodiment, the function may be a programming function, method, class, library, interface, etc. The server 150 may add code for the additional function, such as a protection function, an encryption function, additional functionality function, etc., to the registered package file. Here, the server 150 may provide the package file with the extended function to the electronic device 110 directly and/or through a separate server, for example, the server 160. The application may be installed and executed on the electronic device 110 through the package file of the application. The electronic device 110 may use a desired and/or predetermined service, for example, a game service, a chat service, a social network service (SNS), a streaming service, a mail service, a cloud storage service, and the like, through the application.

In the above example, a function extension system according to some example embodiments is configured on the server 150 to extend at least one function of the package file. Meanwhile, according to other example embodiments, the function extension system may be configured on the electronic device 110. In this case, the electronic device 110 may extend at least one function of the package file by receiving an original package file and by adding software code for the additional function(s) to the received package file.

Figure 2:
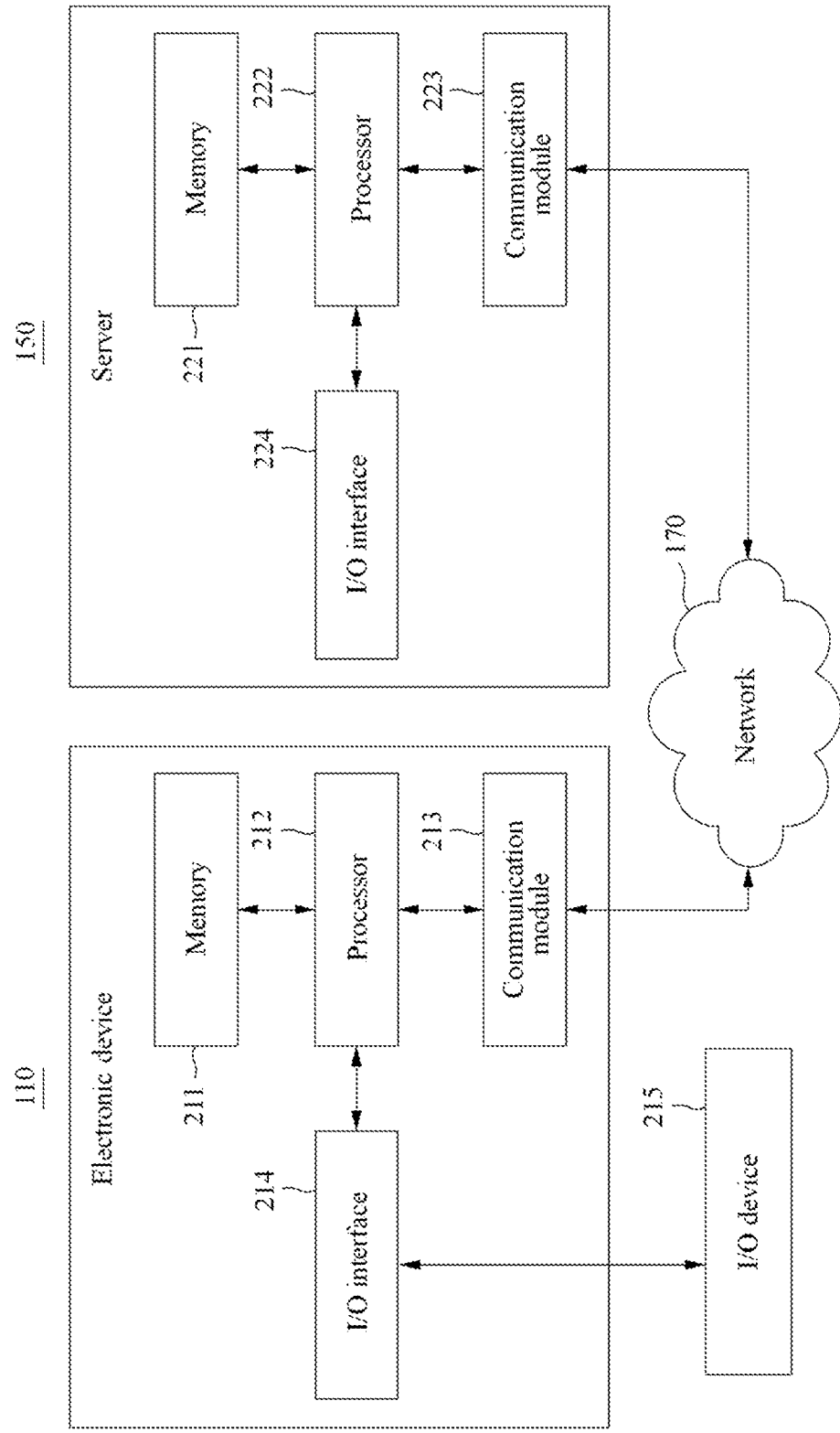
FIG. 2 is a block diagram illustrating an example of a configuration of an electronic device and a server according to at least one example embodiment.

FIG. 2 is a block diagram illustrating an example of a configuration of an electronic device and a server according to at least one example embodiment. FIG. 2 illustrates a configuration of the electronic device 110 as an example for a single electronic device and illustrates a configuration of the server 150 as an example for a single server, but the example embodiments are not limited thereto. The same or similar constituent elements may be applicable to other electronic devices 120, 130, and/or 140, or the server 160, and also to still other electronic devices or still other servers.

Referring to FIG. 2, the electronic device 110 may include a memory 211, at least one processor 212, a communication module 213, and an input/output (I/O) interface 214, and the server 150 may include a memory 221, at least one processor 222, a communication module 223, and an I/O interface 224. The memory 211, 221 may include a permanent mass storage device, such as random access memory (RAM), read only memory (ROM), a disk drive, an optical drive, a solid state drive, etc., as a non-transitory computer-readable storage medium. Also, an OS and at least one program code, for example, code for an application for a video call service, a web browser, etc., installed and executed on the electronic device 110, may be stored in the memory 211, 221. Such software constituent elements may be loaded from another non-transitory computer-readable storage medium separate from the memory 211, 221 using a drive mechanism. The other non-transitory computer-readable storage medium may include, for example, a floppy drive, a disk, a tape, a Blu-ray/DVD/CD-ROM drive, a memory card, etc. According to other example embodiments, software constituent elements may be loaded to the memory 211, 221 through the communication module 213, 223, instead of, or in addition to, the non-transitory computer-readable storage medium. For example, at least one program may be loaded to the memory 211, 221 based on a program, for example, the application, installed by files provided over the network 170 from developers and/or a file distribution system, for example, the server 160, which provides an installation file of the application.

The at least one processor 212, 222 may be configured to process computer-readable instructions, for example, the aforementioned at least one program code, of a computer program by performing basic arithmetic operations, logic operations, and I/O operations. The computer-readable instructions may be provided from the memory 211, 221 and/or the communication module 213, 223 to the processor 212, 222. For example, the at least one processor 212, 222 may be configured to execute received instructions in response to the program code stored in the storage device, such as the memory 211, 221.

The communication module 213, 223 may provide a function for communication between the electronic device 110 and the server 150 over the network 170, and may provide a function for communication with another electronic device, for example, the electronic device 120 or another server, for example, the server 160. For example, the processor 212 of the electronic device 110 may transfer a request, for example, a request for a video call service, created based on program code stored in the storage device such as the memory 211, to the server 150 over the network 170 under control of the communication module 213. Inversely, a control signal, an instruction, content, a file, etc., provided under the control of the processor 222 of the server 150 may be received at the electronic device 110 through the communication module 213 of the electronic device 110 by going through the communication module 223 and the network 170. For example, a control signal, an instruction, etc., of the server 150 received through the communication module 213 may be transferred to the processor 212 or the memory 211, and content, a file, etc., may be stored in a storage medium further included in the electronic device 110.

The I/O interface 214, 224 may be a device used for interface with an I/O device 215. For example, an input device may include a keyboard, a mouse, a stylus, a microphone, a camera, etc., and an output device may include a device, such as a display panel for displaying a communication session of an application, a projector, a speaker, a haptic feedback device, etc. As another example, the I/O interface 214 may be a device for interface with an apparatus in which an input function and an output function are integrated into a single function, such as a touch screen. In detail, when processing instructions of the computer program loaded to the memory 211, the processor 212 of the electronic device 110 may display a service screen configured using data provided from the server 150 or the electronic device 120, or may display content on a display through the I/O interface 214.

According to other example embodiments, the electronic device 110 and the server 150 may include a greater or lesser number of constituent elements than the number of constituent elements shown in FIG. 2. For example, the electronic device 110 may include at least a portion of the I/O device 215, or may further include other constituent elements, for example, a transceiver, a global positioning system (GPS) module, a camera, a variety of sensors, a database, and the like. In detail, if the electronic device 110 is a smartphone, the electronic device 110 may be configured to further include a variety of constituent elements, for example, an accelerometer sensor, a gyro sensor, a camera, various physical buttons, a button using a touch panel, an I/O port, a haptic feedback motor for vibration, etc., which are generally included in the smartphone.

As described above, a function addition method according to example embodiments may be performed at an apparatus, for example, the server 150 or the electronic device 110, storing a package file. Hereinafter, the function addition method for the package file according to example embodiments will be described from perspective of the server 150, however, may be executed through the same constituent element as the electronic device 110 or the server 150.

Figure 3:
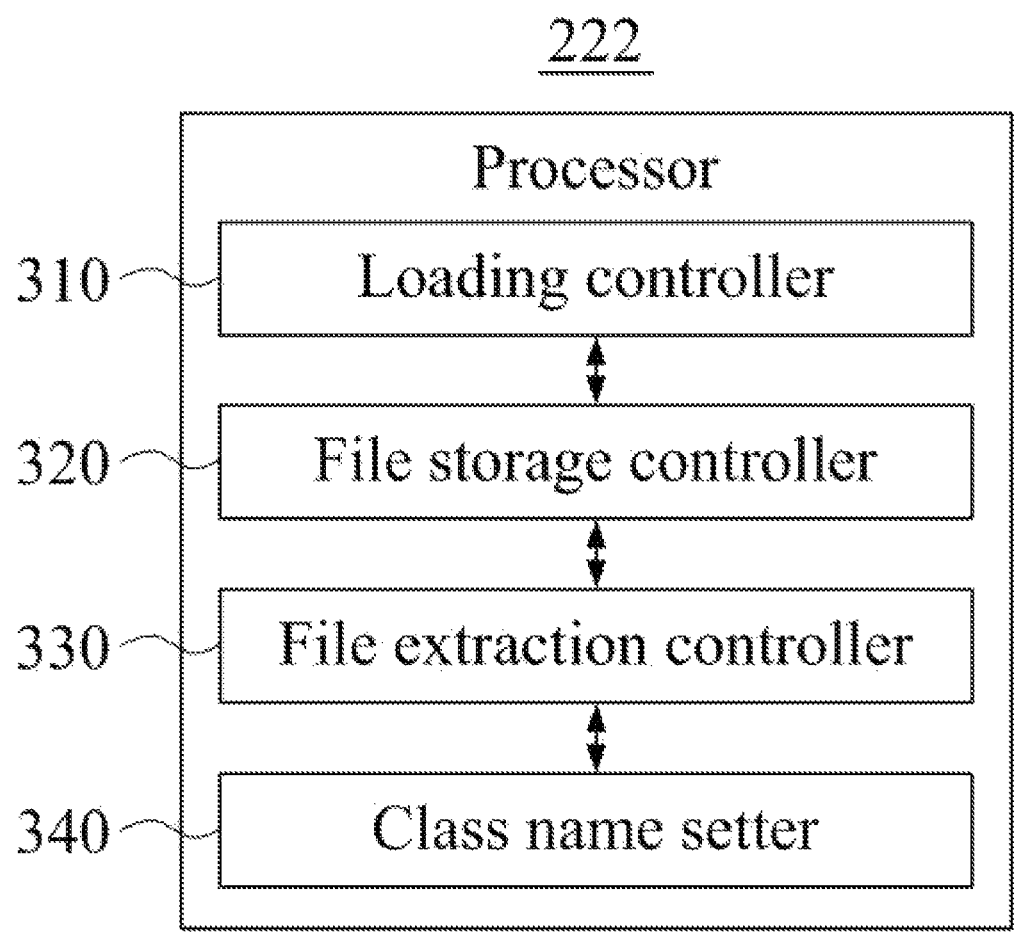
FIG. 3 is a block diagram illustrating an example of constituent elements included in at least one processor of a server according to at least one example embodiment.
Figure 4:
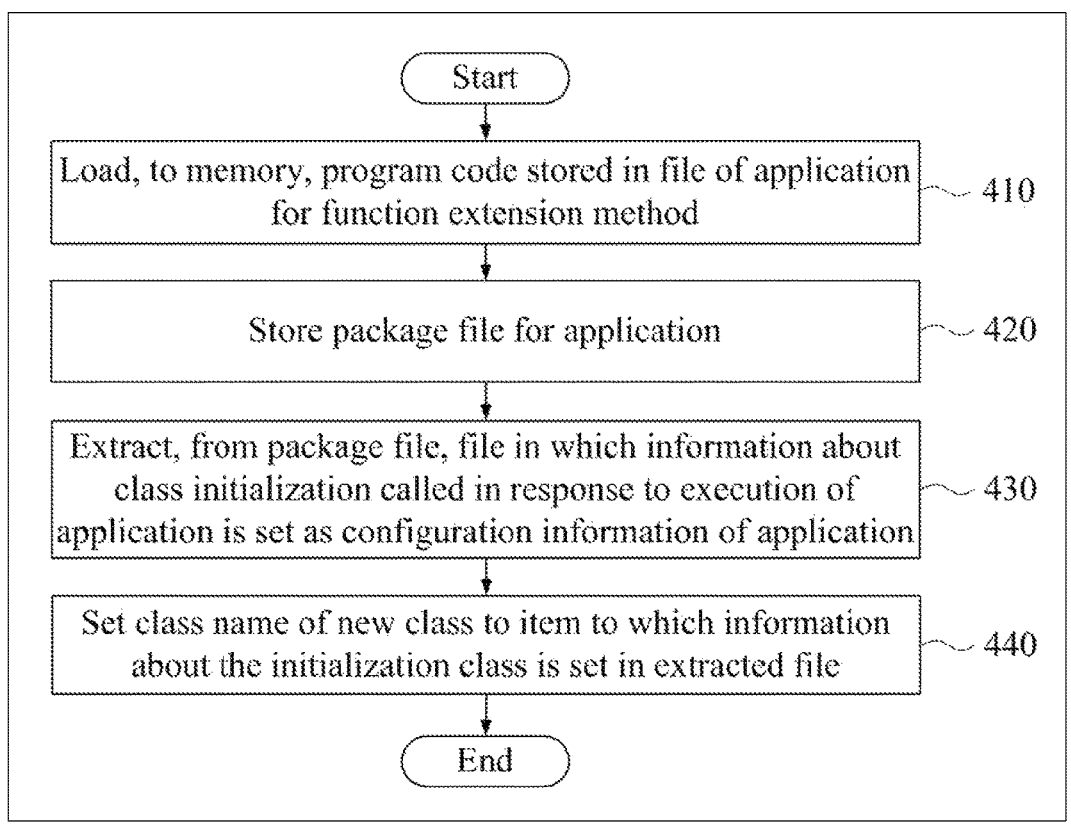
FIG. 4 is a flowchart illustrating an example of a method performed at a server according to at least one example embodiment.

FIG. 3 is a diagram illustrating an example of constituent elements included in at least one processor of a server according to at least one example embodiment, and FIG. 4 is a flowchart illustrating an example of a method performed by a server according to at least one example embodiment.

The server 150 may configure a function extension system. Referring to FIG. 3, the at least one processor 222 of the electronic device 150 may include a loading controller 310, a file storage controller 320, and a file extraction controller 330, and/or a class name setter 340 as constituent elements, but is not limited thereto. The processor 222 and the constituent elements of the processor 222 may control the server 150 to perform operations 410 through 440 included in a function extension method of FIG. 4. Here, the processor 222 and the constituent elements of the processor 222 may be configured to execute computer readable instructions according to code of at least one program and code of an OS included in the memory 221. Also, the constituent elements of the processor 222 may be representations of different functions performed at the processor 222 in response to a control command provided from the program code stored in the server 150. For example, the processor 222 may use the loading controller 310 as a functional representation that operates to load, to the memory 221, a program code stored in a file of the program for the function extension method in response to the control command.

In operation 410, the loading controller 310 may load to the memory 221, program code stored in at least one file of a program for the function extension method. For example, in response to execution of the program at the server 150, the loading controller 310 may control the server 150 to load the program code from the at least one file of the program to the memory 221 under control of the OS.

Here, the file storage controller 320, the file extraction controller 330, and the class name setter 340 included in the processor 222 may be different functional representations of the processor 222 to perform operations 420 through 440 by executing a command of a portion corresponding to the program code loaded to the memory 221.

In operation 420, the file storage controller 320 may store a package file for an application. The package file may be provided in a form of a compressed file in which program code for the application have been compiled and the files are packaged, such as an Android application package (APK) file for an Android OS, but is not limited thereto. For example, the server 150 may be configured as a computer, and the file storage controller 320 may control the server 150 so that the package file may be stored and managed in a storage device included in the computer.

Additionally, while various example embodiments will be described in relation to Android and/or APK files, the example embodiments are not limited thereto, and any operating system and their related package file system may be used. For example, one or more example embodiments may be used with iOS and IPA files, etc.

In operation 430, the file extraction controller 330 may extract, from the package file, at least one file in which information about a class most initially called (e.g., an initialization class, or a class called first) in response to execution of the application is set as configuration information of the application. For example, the APK file (e.g., package file) may include a binary extensible markup language (XML) file, such as an Android manifest file, for example, AndroidManifest.xml, that may act as an initialization file (and/or declaration file) and provide various configuration settings information related to the application for use with a desired OS, such as Android. The Android manifest file is a basic native file of an Android application configuration and has the function of setting a user right and/or permission to register an activity that constitutes a screen and/or to use a device resource. Also, as described above, the Android manifest file is configured using a binary XML and content thereof may be viewed using a specific program, which is similar to a general XML file.

Information about the class that is initially called in response to execution of the application may be set to the Android manifest file as configuration information of the application. The Android manifest file may include an application item, an activity item, a service item, a receiver item, and/or a provider item, etc.

In operation 440, the class name setter 340 may set a class name of a new class as an item to which information about the initialization class is set in the extracted file. For example, the class name setter 340 may retrieve a class defined to be the initialization class called from among various items of the Android manifest file. If the class defined to be the initialization class is defined in the application item, the class name setter 340 may change a class name of the class defined in the application item with the class name of the new class.

Also, the class defined to be the initialization class may be present in another item, for example, the activity item, the service item, the receiver item, and/or the provider item, instead of the application item. Even in this case, the class name setter 340 may change a class name of the corresponding class with the class name of the new class.

Additionally, the class name setter 340 may designate the class name of the new class to an application item having a top priority, and may set the new class to be the initialization class, without a separate process of verifying whether the new class name is an existing class.

Here, a system, for example, the electronic device 110, which executes the application may call the new class using the class name of the class defined to be the initialization class called in the application item. Accordingly, the new class that includes code for a new function may be the first function executed, for example, prior to the execution of the original code of the package file.

According to at least one example embodiment, the extracting from the package file, such as, the Android manifest file, and using the file in which information about an initialization class called in response to the execution of an application is set as configuration information is described with reference to FIGS. 3 and 4.

Meanwhile, the code for the new function may be added through the disassembling of the package file as will be discussed in greater detail below.

Figure 5:
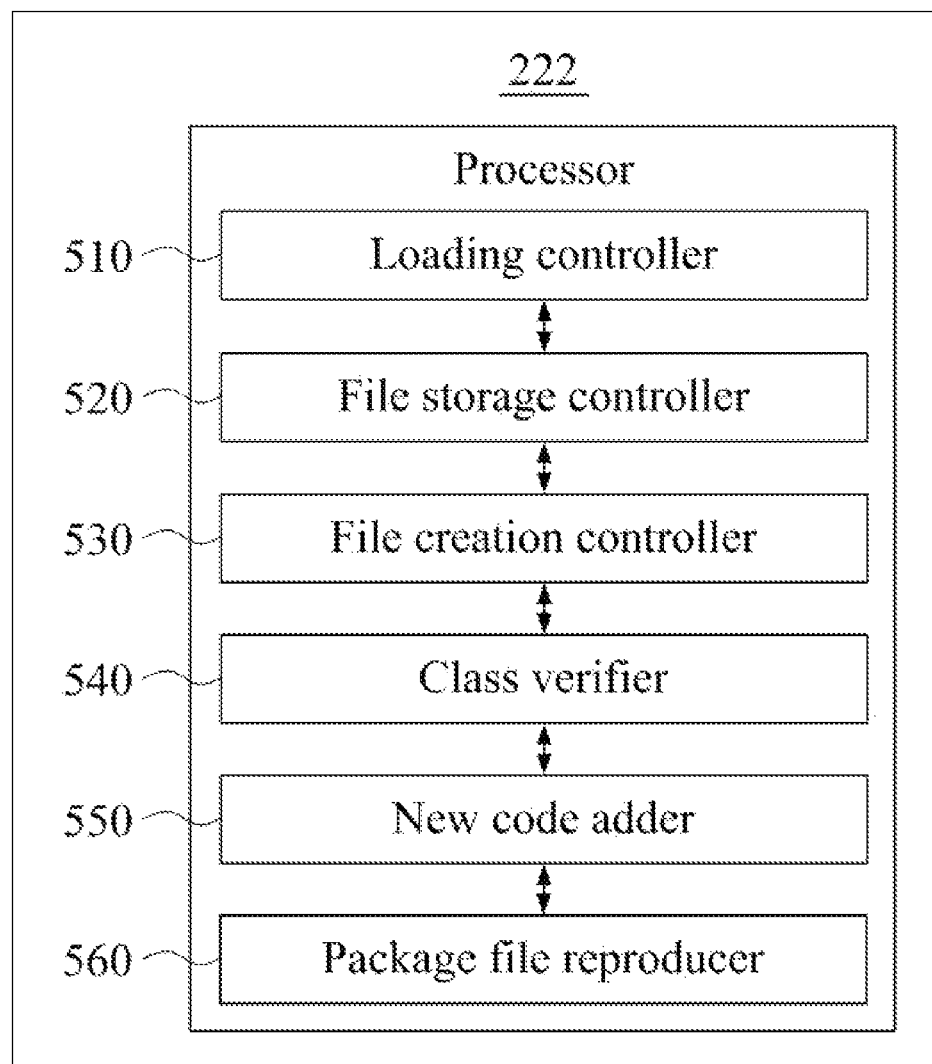
FIG. 5 is a block diagram illustrating another example of constituent elements included in at least one processor of a server according to at least one example embodiment.
Figure 6:
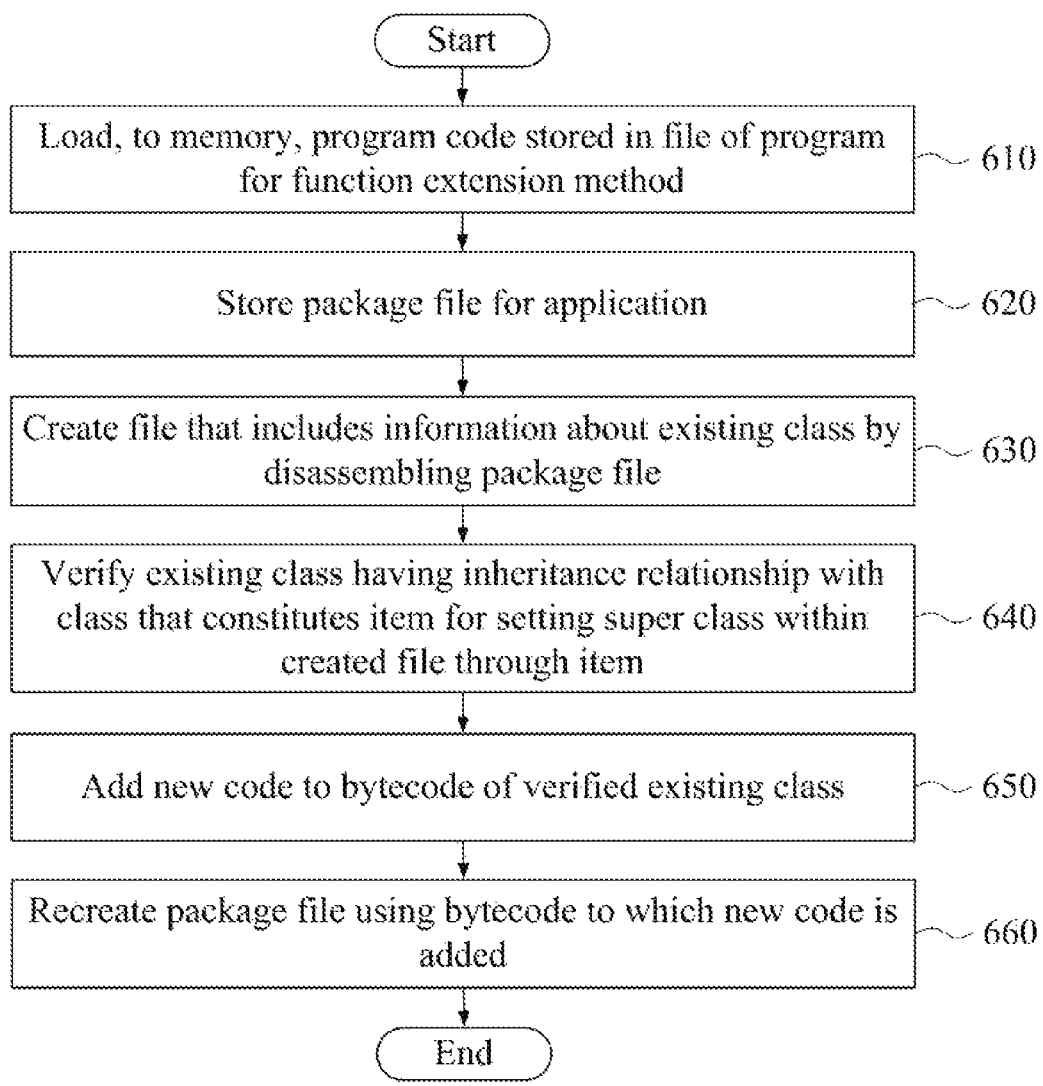
FIG. 6 is a flowchart illustrating another example of a method performed at a server according to at least one example embodiment.

FIG. 5 is a block diagram illustrating another example of constituent elements included in at least one processor of a server according to at least one example embodiment, and FIG. 6 is a flowchart illustrating another example of a method performed by a server according to at least one example embodiment.

The server 150 may configure a function extension system. Referring to FIG. 5, the at least one processor 222 included in the server 150 may include a loading controller 510, a file storage controller 520, a file creation controller 530, a class verifier 540, a new code adder 550, and/or a package file reproducer 560, etc., but is not limited thereto. The at least one processor 222 and the constituent elements of the processor 222 may control the server 150 to perform operations 610 through 660 included in the function extension method of FIG. 6. Here, the processor 222 and the constituent elements of the processor 222 may be configured to execute computer readable instructions according to software code of at least one program and code of an OS included in the memory 221. The constituent elements of the processor 222 may be representations of different functions performed at the processor 222 in response to a control command provided from the program code stored in the server 150. For example, the loading controller 510 may be used as a functional representation that the processor 222 operates to load, to the memory 221, the program code stored in the file of the program for the function extension method in response to the control command.

In operation 610, the loading controller 510 may load to the memory 221, program code stored in at least one file of a program for the function extension method. For example, in response to execution of the program at the server 150, the loading controller 510 may control the server 150 to load the program code from the file of the program to the memory 221 under control of the OS.

Here, the file storage controller 520, the file creation controller 530, the class verifier 540, the new code adder 550, and the package file reproducer 560 included in the processor 222 may be functional representations of the processor 222 to perform operations 620 through 660 by executing an instruction of a portion corresponding to the program code loaded to the memory 221, respectively.

In operation 620, the file storage controller 520 may store a package file for an application. The package file may be provided in the form of a compressed file in which program codes for the application have been compiled and files are packaged, such as an APK file for an Android OS, an IPA file for iOS, etc. For example, the server 150 may be configured as a computer, and the file storage controller 520 may control the server 150 so that the package file may be stored and managed in a storage device included in the computer.

In operation 630, the file creation controller 530 may create a file that includes information about an existing class by disassembling the package file. For example for an Android application, a file that includes a smali code in which Dalvik bytecode of the APK file has been disassembled may be created. The file may have ".smali" as a file extension. Frameworks, Dalvik class files, app files, etc., used in Android OS are Java files and may be decompiled or recompiled through a smali tool, but the example embodiments are not limited thereto and other forms of binary code files and source code files may be decompiled and/or recompiled using other compilation tools. Here, a file, for example, a file with extension of ".smali", acquired by disassembling the APK file may include an item, such as ".super" item, to set a super class and/or generate constructors for the package file.

In operation 640, the class verifier 540 may verify an existing class having an inheritance relationship with a class that constitutes the item for setting the a super class within the created file through the item. The class having the inheritance relationship with the class that configures the item, for example, a ".super" item of the Android OS that sets the super class may be the initialization class that is executed in response to execution of the application through the package file.

In operation 650, the new code adder 550 may add new code to a bytecode of the verified existing class. Here, the verified existing class may be an initialization class that is initially executed. The new code adder 550 may add, to the package file, the initialization code that is to be executed prior to the original code of the package file by adding the code for the new function and/or code for calling a separate (new) library or (new) class to the bytecode of the existing class. Here, the new code adder 550 may set the new code to be initially executed prior to the original code of the package file in response to execution of the application by adding the new code to a creator method and/or a static scope of the bytecode of the existing class. As another example, the new code adder 550 may add a class that includes the new code to the bytecode as a member, may add the new code to a method that is executed first in the bytecode, and/or may add a method that includes the new code to the bytecode so that the method may be the first method called based on a system lifecycle of the application. For example, the system lifecycle may include an Android lifecycle, but is not limited thereto.

In operation 660, the package file reproducer 560 may recreate the package file using the new bytecode to which the new code is added. The recreated package file may be transmitted to the system, for example, the electronic device 110, on which the application is to be executed. In response to the installation and execution of the application on the system, the new code added to the bytecode of the class to be called first may be initially executed. That is, since the existing initialization class is executed first in response to the execution of the application, the new code included in the bytecode may be executed prior to the execution of the original code of the package file.

Figure 7:
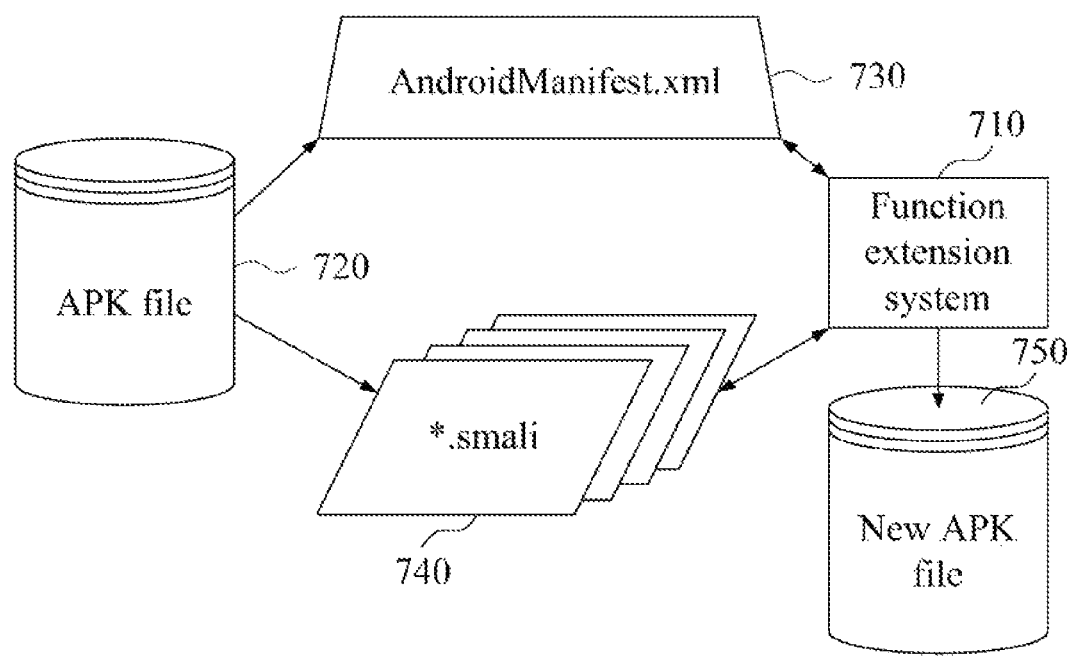
FIG. 7 illustrates an example of a process of adding a code for a new function to a package file according to at least one example embodiment.

FIG. 7 illustrates an example of a process of adding a code for a new function to a package file according to at least one example embodiment. FIG. 7 illustrates a process of creating using a function extension system 710 configured in the server 150, information files regarding information about existing classes, such as files with an extension ".smali" for Android OS. The information file may be created by extracting the Android manifest file "AndroidManifest.xml" 730 from a package file (e.g., the APK file 720) stored in the storage device of the server 150 and/or by disassembling the package file (e.g., APK file 720).

As described above with regards to FIGS. 3 and 4, the function extension system 710 may designate a class name of a new class in a specific item, for example, an application item, an activity item, a service item, a receiver item, or a provider item, etc., of the Android manifest file "AndroidManifest.xml" 730, and/or may change a class name of a class, for example, an initialization class to be called first, set to a corresponding item with the class name of the new class. Additionally, the function extension system 710 may create a new package file 750 (e.g., APK file, etc.) of which the new class is to be the first class called based on a change of the class name.

Additionally, as described above with regards to FIGS. 5 and 6, the function extension system 710 may verify a ".super" item from a file with an extension ".smali" created through disassembling of the compiled code of the application and may add new code to the bytecode of an existing class having an inheritance relationship with a class that configures the ".super" item. The bytecode to which the new code is added may be packaged in the package file (e.g., the APK form recognizable by an Android OS), and the new APK file 750 may be created.

Dissimilar to the example embodiments of FIGS. 3 through 7, the following example embodiments relate to a function extension method that may immediately execute a new class without requiring a separate loading process, a definition process for a class interface, and/or an additional procedure for calling a call, when adding a class to a package file. The example embodiments relate to a function extension method based on the electronic device 110 on which the application is installed and executed since the function is extended by adding the new class at an execution point in time of the application, or in other words, during run time of the application.

Figure 8:
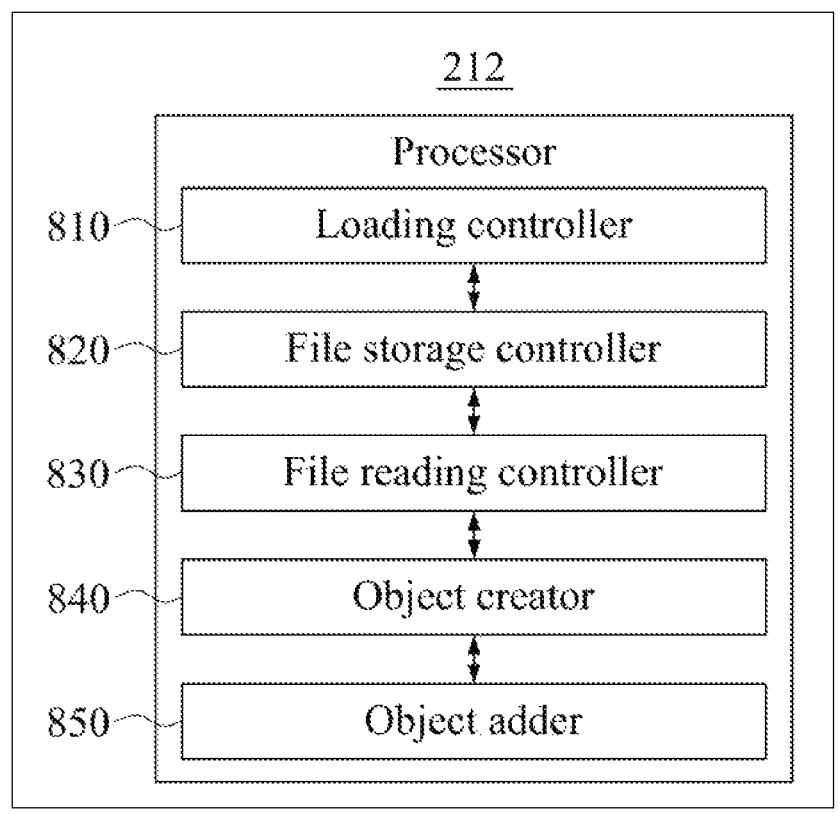
FIG. 8 is a block diagram illustrating an example of constituent elements included in at least one processor of an electronic device according to at least one example embodiment.
Figure 9:
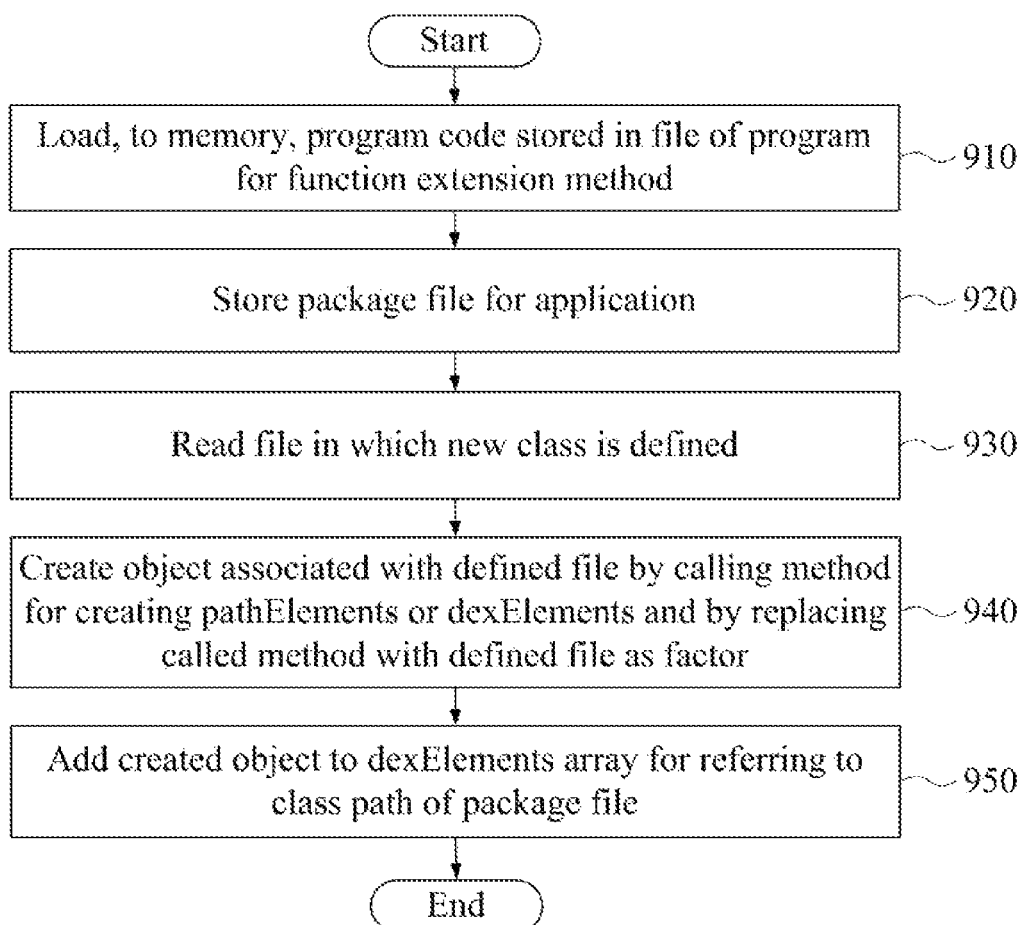
FIG. 9 is a flowchart illustrating an example of a method performed at an electronic device according to at least one example embodiment.

FIG. 8 is a block diagram illustrating an example of constituent elements included in at least one processor of an electronic device according to at least one example embodiment, and FIG. 9 is a flowchart illustrating an example of a method performed by an electronic device according to at least one example embodiment.

The electronic device 110 may configure a function extension system. Referring to FIG. 8, the at least one processor 212 of the electronic device 110 may include a loading controller 810, a file storage controller 820, a file reading controller 830, an object creator 840, and an object adder 850, etc., as constituent elements, but is not limited thereto. Here, the processor 212 and the constituent elements of the processor 212 may control the electronic device 110 to perform operations 910 through 950 included in the function extension method of FIG. 9. Here, the processor 212 and the constituent elements of the processor 212 may be configured to execute computer readable instructions according to software code of at least one program and software code of an OS included in the memory 211. Also, the constituent elements of the processor 212 may be representations of different functions performed at the processor 212 in response to a control command provided from the program code stored in the electronic device 110. For example, the processor 212 may use the loading controller 810 as a functional representation that operates to load, to the memory 211, the program code stored in the file of the program for the function extension method in response to the control command.

In operation 910, the loading controller 810 may load to the memory 211, program code stored in at least one file of a program for the function extension method. For example, in response to execution of the program at the electronic device 110, the loading controller 810 may control the electronic device 110 to load the program code from the at least one file of the application to the memory 211 under control of the OS. Here, the program for the function extension method may be a program different from the application to be described below.

Here, the file storage controller 820, the file reading controller 830, the object creator 840, and the object adder 850, etc., included in the processor 212 may be functional representations of the processor 212 to perform operations 920 through 950 by executing a command of a portion corresponding to the program code loaded to the memory 211.

In operation 920, the file storage controller 820 may store a package file for an application. The package file may be provided in the form of a compressed file in which program code for the application have been compiled and the files are packaged, such as an APK file for an Android OS, an IPA for iOS, etc. For example, the electronic device 110 may be configured as a computer, and the file storage controller 720 may control the electronic device 110 so that the package file may be stored and managed in a storage device included in the computer.

In operation 930, the file reading controller 830 may read a file in which the new class is defined. The following operations 940 and 950 may be performed to immediately use the new class as if the new class has already been loaded to a virtual machine, for example, a Dalvik or ART virtual machine of Android, etc., without the need or requirement of a separate loading process and/or calling process.

In operation 940, the object creator 840 may create an object associated with the defined file by calling a method for creating class path elements (e.g., pathElements) or Dalvik executable format ("dex") path elements (e.g., dexElements) and by replacing the called method with the defined file as a factor. In other words, the object creator 840 may call a method for creating and/or defining class definitions, variable types, etc., and by replacing (and/or overriding) the previously defined/called method with a new method based on the defined file (e.g., class files, libraries, JAR files, etc.). For example, the object creator 840 may create the object associated with the defined file by replacing a makeDexElements method or a makePathElements method configured as a pathList member object within a class loader that is called from the context of an Android OS with the defined file as the factor. As another example, the object creator 840 may create the object associated with the defined file by replacing the makeDexElements method or the makePathElements method configured as a pathList class provided from the Android OS with the defined file as a factor.

In operation 950, the object adder 850 may add the created object to a dexElements array for referring to a class path of the package file (e.g., a dex or a resource path that lists a file directory including related code libraries). For example, the object adder 850 may create a new array that includes an original value included in the dexElements array and a result value of calling the makeDexElements method and/or the makePathElements method (e.g., methods to create an array of elements). That is, the object adder 850 may copy and store all of the original values included in the dexElements array and the result value of calling the makeDexElements method or the makePathElements method by declaring a new array associated with the created object, and may add to the dexElements array an object created by replacing (and/or overriding) the dexElements array with the new array.

Accordingly, the electronic device 110 may execute the new class using the object included in the dexElements array in response to execution of the application without loading or calling the new class.

Figure 10:
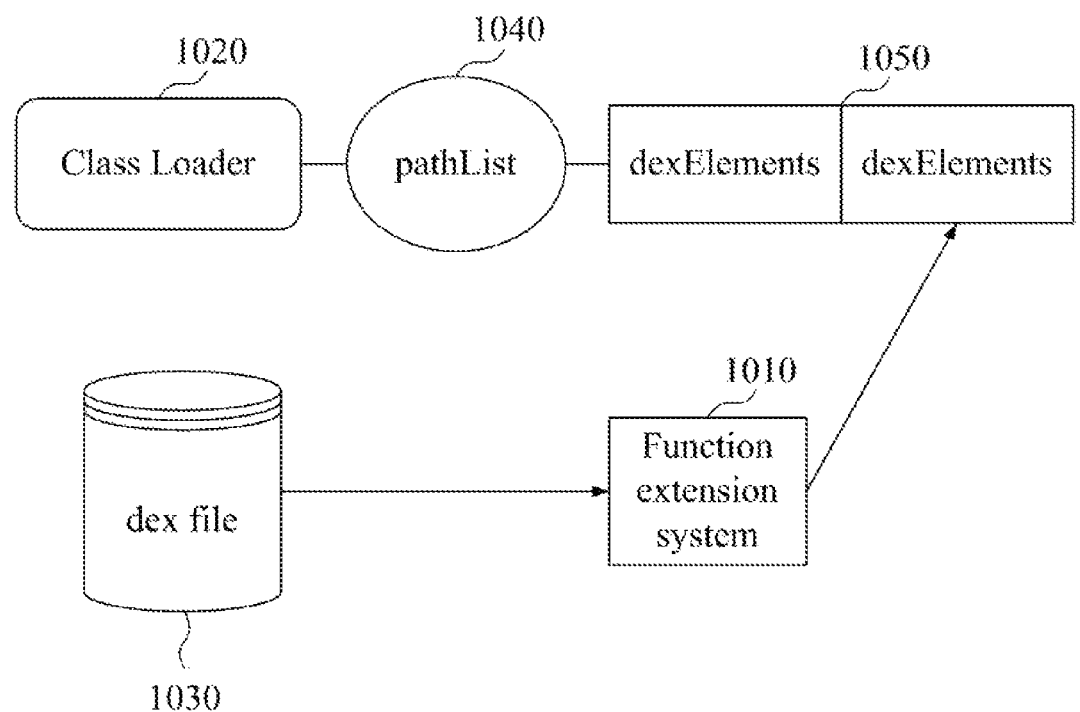
FIG. 10 illustrates an example of a process of extending a class at an execution point in time of an application according to at least one example embodiment.

FIG. 10 illustrates an example of a process of extending a class at an execution point in time of an application (e.g., during run-time) according to at least one example embodiment. FIG. 10 illustrates an example of a function extension method in which a function extension system 1010 configured in the electronic device 110 may extend at least one class at an execution point in time of an application using a package file stored in a storage device of the electronic device 110.

The function extension system 1010 may call a class loader 1020 from context information (e.g., an interface to global information about the application's environment) provided by the OS, such as the Android OS, and may read a file, e.g., dex file 1030, in which a corresponding new class is defined prior to the execution of the new class.

Also, the function extension system 1010 may fetch a member object, such as a member object listed in pathList 1040, within the class loader 1020, and may fetch an array 1050 of elements (e.g., dexElements) configured in the member object of the pathList 1040.

For example, the function extension system 1010 may acquire a call result by replacing (and/or overriding) a method, such as the "makePathElements" method or the "makeDexElements" method, configured in the member object of the pathList 1040 with the dex file 1030. A process of calling the "makePathElements" method or the "makeDexElements" method may acquire the same result with a scheme of directly using a class, for example, a class for the "makePathElements" method or the "makeDexElements" method, provided by the Android system, or another native base class and method provided by an OS, without a process of calling the class loader 1020 or fetching the member object of the pathList 1040 within the class loader 1020.

Once the object is created as a result of calling the desired method, the function extension system 1010 may add, to the array 1050 of dexEelements, the object created by calling the desired method. A method of adding the object to the array 1050 of dexEelements may be performed through a process of creating a new array that includes the original value(s) included in the array 1050, e.g., the original array variables/values, and the result value of calling the method, copying and adding all of the original value and the result value to the created new array, and replacing the array 1050 with the new array.

Since the object of the file in which the new class is defined is added to the array 1050 of dexEelements, the new class may be immediately used even in a run-time execution state in which the new class has already been loaded without needing a separate loading process for the new class, or an additional process of defining an interface of the loaded class and/or calling the new class, for example, a process of adding a code for calling the new class.

According to some example embodiments, it is possible to extend at least one function by inserting additional code executable prior to the execution of original code in a package file that has been completed and does not allow for code correction.

According to some example embodiments, it is possible to immediately execute a new class without executing a separate loading process, defining a definition process for a class interface, and/or adding an additional procedure for calling a call, when adding a new class to a package file.

The units described herein may be implemented using hardware components or a combination of hardware and software components. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM, random access memory (RAM, flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A function addition method for a software package file, the function addition method comprising:
   loading, using at least one processor, program code stored in at least one file of a program for a function to be added to a memory;
   storing, using the at least one processor, a package file for a software application in the memory;
   extracting, using the at least one processor, in response to execution of the software application, a configuration file in which information about an initialization class is set as configuration information of the software application from the package file for the software application;
   setting, using the at least one processor, a class name of a new class as an item of the configuration file to which the information about the initialization class is set in the extracted configuration file; and
   recreating, using the at least one processor, the package file for the software application based on the extracted configuration file to which the class name of the new class is set as the item of the configuration file,
   wherein a new code included in the new class is executed prior to an original code of the package file for the software application using the class name of the new class set to the item of the configuration file in response to execution of the software application installed on an electronic device using the recreated package file for the software application.

2. The function addition method of claim 1, wherein the extracted configuration file includes the configuration information of the software application and setting information of the software application, and wherein the extracted configuration file is an extensible markup language (XML) file.

3. The function addition method of claim 1, wherein:
   the package file for the software application is an Android application package (APK) file for an Android operating system (OS);
   the extracted configuration file is an Android manifest file; and
   the item of the configuration file is at least one of a software application item, an activity item, a service item, a receiver item, and a provider item, included in the Android manifest file.

4. The function addition method of claim 1, wherein the setting of the class name of the new class comprises:
   replacing a class name of an existing class with the class name of the new class in response to the existing class being set to the item of the configuration file to which the information about the initialization class is set as the item of the configuration file.

5. A function addition method for a software package file, the function addition method comprising:
   loading, using at least one processor, program code stored in at least one file of a program for a function to be added to a memory;
   storing, using the at least one processor, a package file for a software application in the memory;
   creating, using the at least one processor, a configuration file that includes information about an existing class of the package file for the software application, wherein the information about the existing class of the package file is extracted from the package file for the software application by disassembling the package file for the software application;
   verifying, using the at least one processor, the existing class of the package file for the software application having an inheritance relationship with a class that constitutes an item for setting a super class within the created configuration file through the item;
   adding, using the at least one processor, new code to a bytecode of the verified existing class of the package file for the software application; and
   recreating, using the at least one processor, the package file for the software application based on the bytecode of the verified existing class of the package file for the software application to which the new code is added,
   wherein the new code included in the bytecode of the verified existing class of the package file for the software application is executed prior to execution of original code of the package file for the software application in response to execution of the existing class of the package file for the software application in response to execution of the software application.

6. The function addition method of claim 5, wherein the adding of the new code comprises adding the new code to a creator method or a static scope of the bytecode of the verified existing class of the package file for the software application.

7. The function addition method of claim 5, wherein the adding of the new code comprises:
   adding a class that includes the new code to the bytecode of the verified existing class of the package file for the software application as a member;
   adding the new code to an initialization method in the bytecode of the verified existing class of the package file for the software application; or
   adding a new method that includes the new code to the bytecode of the verified existing class of the package file for the software application so that the new method is the initialization method based on a system lifecycle of the software application.

8. The function addition method of claim 5, wherein:
   the package file for the software application is an Android application package (APK) file for an Android operating system (OS); and
   the created configuration file includes smali code in which Dalvik bytecode corresponding to the APK file is disassembled.

9. A function addition method for a software package file, the function addition method comprising:
   loading, using at least one processor, program code stored in at least one file of a program for a function to be added to a memory;

storing, using the at least one processor, a package file for a software application in the memory;

reading, using the at least one processor, a definition file in which a new class is defined from the memory;

creating, using the at least one processor, an object associated with the definition file by:
- calling a method for creating pathElements or dexElements, and
- replacing the called method with the definition file as a factor;

adding, using the at least one processor, the created object to a dexElements array for referring to a class path of the package file for the software application; and executing, using the at least one processor, the new class using the created object included in the dexElements array without loading and calling the new class in response to execution of the software application.

10. The function addition method of claim 9, wherein:

the package file for the software application is an Android application package (APK) file for an Android operating system (OS); and the creating of the object comprises creating the object by replacing a desired method, wherein the desired method is a makeDexElements method or a makePathElements method, and wherein the created object is configured as a pathList member object within a class loader that is called from a context of the Android OS with the definition file as a factor.

11. The function addition method of claim 9, wherein:

the package file for the software application is an APK file for an Android OS; and the creating of the object comprises creating the object by replacing a desired method, wherein the desired method is a makeDexElements method or a makePathElements method, and wherein the created object is configured as a pathList class that is provided by the Android OS with the definition file as a factor.

12. The function addition method of claim 9, wherein:

the adding comprises creating a new array that includes an original value included in the dexElements array and a result value of calling a desired method, and replacing the dexElements array with the new array.

* * * * *